US011741995B1

(12) United States Patent
Achddou et al.

(10) Patent No.: US 11,741,995 B1
(45) Date of Patent: Aug. 29, 2023

(54) SYSTEMS AND METHODS FOR SWITCHING BETWEEN VIDEO VIEWS

(71) Applicant: GoPro, Inc., San Mateo, CA (US)

(72) Inventors: Thomas Achddou, Paris (FR); Guillaume Oulès, Bordeaux (FR); Evan Kosowski, San Diego, CA (US); Steven Fortunato, Solana Beach, CA (US)

(73) Assignee: GoPro, Inc., San Mateo, CA (US)

( * ) Notice: Subject to any disclaimer, the term of this patent is extended or adjusted under 35 U.S.C. 154(b) by 65 days.

(21) Appl. No.: 17/449,395

(22) Filed: Sep. 29, 2021

(51) Int. Cl.
*G06F 3/048* (2013.01)
*G11B 27/031* (2006.01)
*G06F 3/04842* (2022.01)
*H04N 21/845* (2011.01)
*H04N 21/81* (2011.01)

(52) U.S. Cl.
CPC ........ *G11B 27/031* (2013.01); *G06F 3/04842* (2013.01); *H04N 21/8173* (2013.01); *H04N 21/8456* (2013.01)

(58) Field of Classification Search
CPC .............. G11B 27/031; G06F 3/04842; H04N 21/8173; H04N 21/8456
See application file for complete search history.

(56) References Cited

U.S. PATENT DOCUMENTS

| | | | |
|---|---|---|---|
| 6,597,375 B1 * | 7/2003 | Yawitz | G11B 27/34 715/725 |
| 8,591,332 B1 * | 11/2013 | Bright | A63F 13/42 463/31 |
| 8,826,117 B1 * | 9/2014 | Junee | G11B 27/34 715/230 |
| 9,478,255 B1 * | 10/2016 | Gregg | H04N 5/781 |
| 10,622,021 B2 * | 4/2020 | Buyuklu | G11B 27/34 |
| 10,645,468 B1 * | 5/2020 | Kislevitz | G06F 18/22 |
| 11,430,484 B1 * | 8/2022 | Fortunato | G06F 3/04847 |
| 2007/0174774 A1 * | 7/2007 | Lerman | G06F 16/40 715/723 |
| 2008/0247726 A1 * | 10/2008 | Lee | G11B 27/038 386/282 |
| 2012/0017152 A1 * | 1/2012 | Matsuda | G11B 27/34 715/723 |
| 2012/0051719 A1 * | 3/2012 | Marvit | H04N 7/155 386/285 |
| 2013/0047082 A1 * | 2/2013 | Long | G06F 3/04817 715/708 |
| 2014/0223482 A1 * | 8/2014 | McIntosh | G11B 20/00007 725/41 |
| 2014/0304602 A1 * | 10/2014 | Lettau | G11B 27/031 715/723 |
| 2016/0104508 A1 * | 4/2016 | Chee | H04N 21/2668 386/227 |
| 2016/0225408 A1 * | 8/2016 | Khan | G11B 27/34 |
| 2017/0031580 A1 * | 2/2017 | Masaki | G06F 3/0482 |
| 2017/0109585 A1 * | 4/2017 | Matias | H04N 23/64 |
| 2017/0229147 A1 * | 8/2017 | McKaskle | H04N 21/47205 |

(Continued)

*Primary Examiner* — Rashawn N Tillery
(74) *Attorney, Agent, or Firm* — Esplin & Associates, PC

(57) ABSTRACT

A graphical user interface may provide presentation of a video edit during video edit playback. The video edit may include a segment of a video. When a user modifies the segment of the video included in the video edit, the graphical user interface may automatically switch the presentation of the video edit into presentation of the original video.

20 Claims, 9 Drawing Sheets

(56) References Cited

U.S. PATENT DOCUMENTS

2019/0051330 A1* 2/2019 Moore ................. G11B 27/038
2021/0383837 A1* 12/2021 Ren ......................... G06F 9/542
2022/0206738 A1* 6/2022 Anvaripour ............. H04L 51/10
2022/0392492 A1* 12/2022 Fortunato .............. G11B 27/10

* cited by examiner

SYSTEMS AND METHODS FOR SWITCHING BETWEEN VIDEO VIEWS

FIELD

This disclosure relates to an interface that switches between a view of a video and a view of a video edit.

BACKGROUND

An effect may be applied to a segment of a video to generate a video edit. A user may wish to change the segment of the video used in the video edit. Manually switching between the views of the original video and the video edit for changing the video segment selection may be cumbersome.

SUMMARY

This disclosure relates to switching between video views. Video information, video edit information, and/or other information may be obtained. The video information may define a video having a progress length. The video edit information may define a video edit of the video. The video edit may include a segment of the video. A graphical user interface may be presented on a display. The graphical user interface may include a preview section. The preview section may provide a preview of the video and the video edit. The preview of the video and the video edit provided in the preview section may include: presentation of the video edit during video edit playback; and presentation of the video during modification of the segment of the video included in the video edit.

A system for switching between video views may include one or more electronic storage, processor, and/or other components. The electronic storage may store video information, information relating to one or more videos, video edit information, information relating to one or more video edits, information relating to one or more graphical user interfaces, information relating to preview of video, information relating to preview of video edit, information relating to presentation of video edit, information relating to presentation of video, and/or other information.

The processor(s) may be configured by machine-readable instructions. Executing the machine-readable instructions may cause the processor(s) to facilitate switching between video views. The machine-readable instructions may include one or more computer program components. The computer program components may include one or more of a video information component, a video edit information component, a graphical user interface component, and/or other computer program components.

The video information component may be configured to obtain video information and/or other information. The video information may define a video. The video may have a progress length.

The video edit information component may be configured to obtain video edit information for the video and/or other information. The video edit information may define a video edit of the video. The video edit may include a segment of the video.

The graphical user interface component may be configured to present a graphical user interface on a display. The graphical user interface may include a preview section. The preview section may provide a preview of the video and the video edit. The preview of the video and the video edit provided in the preview section may include: presentation of the video edit during video edit playback; and presentation of the video during modification of the segment of the video included in the video edit.

In some implementations, the presentation of the video edit during the video edit playback may include presentation of an edited version of the video. In some implementations, the presentation of the video during the modification of the segment of the video included in the video edit may include presentation of an unedited version of the video.

In some implementations, the preview of the video and the video edit changes from the presentation of the edited version of the video to the presentation of the unedited version of the video responsive to beginning of user input to modify the segment of the video included in the video edit and/or other information. In some implementations, the preview of the video and the video edit changes from the presentation of the unedited version of the video to the presentation of the edited version of the video responsive to ending of the user input to modify the segment of the video included in the video edit and/or other information.

In some implementations, the video edit playback may be engaged automatically based on the ending of the user input to modify the segment of the video included in the video edit and/or other information.

In some implementations, the graphical user interface may further include: a timeline element that represents the progress length of the video; and an inclusion element that represents the segment of the video included in the video edit. In some implementations, the user input to modify the segment of the video included in the video edit may be obtained based on user interaction with the inclusion element to change a location of the inclusion element along the timeline element. In some implementations, the user input to modify the segment of the video included in the video edit may be obtained based on user interaction with the inclusion element to change a size of the inclusion element along the timeline element.

In some implementations, the preview of the video and the video edit provided in the preview section may further include presentation of the video during selection of a portion of the video to which one or more video effects is applied.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
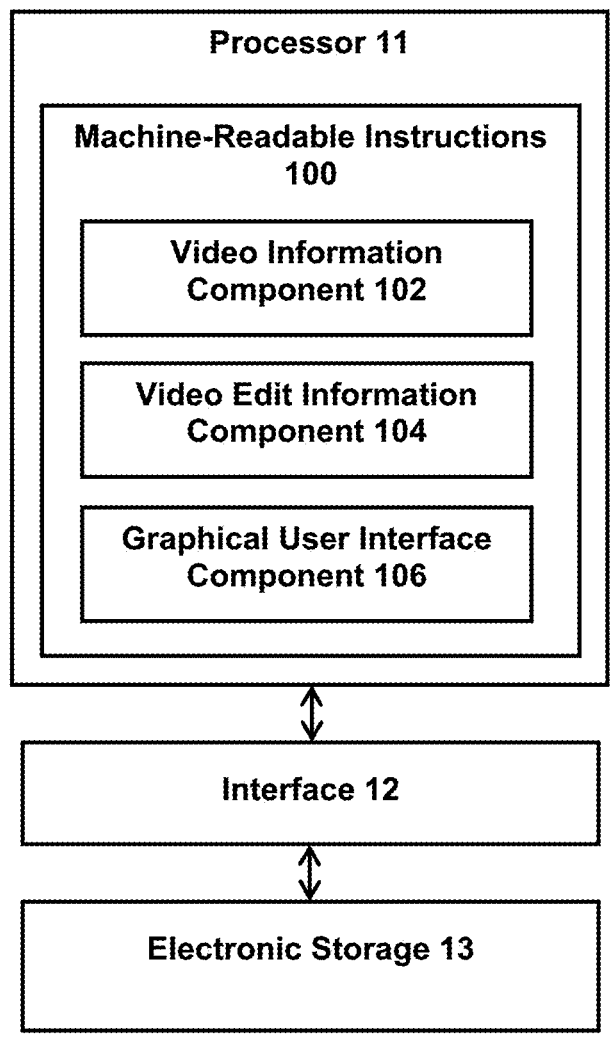
FIG. 1 illustrates a system for presenting an interface that switches between a view of a video and a view of a video edit.

FIG. 1 illustrates a system 10 for presenting an interface that switches between a view of a video and a view of a video edit. The system 10 may include one or more of a processor 11, an interface 12 (e.g., bus, wireless interface), an electronic storage 13, and/or other components. Video information, video edit information, and/or other information may be obtained by the processor 11. The video information may define a video having a progress length. The video edit information may define a video edit of the video. The video edit may include a segment of the video. A graphical user interface may be presented by the processor 11 on a display. The graphical user interface may include a preview section. The preview section may provide a preview of the video and the video edit. The preview of the video and the video edit provided in the preview section may include: (1) presentation of the video edit during video edit playback; and (2) presentation of the video during modification of the segment of the video included in the video edit.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to one or more videos, video edit information, information relating to one or more video edits, information relating to one or more graphical user interfaces, information relating to preview of video, information relating to preview of video edit, information relating to presentation of video edit, information relating to presentation of video, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting an interface that switches between video views. The machine-readable instructions 100 may include one or more computer program components. The machine-readable instructions 100 may include one or more of a video information component 102, a video edit information component 104, a graphical user interface component 106, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more sensors, electronic storage of a device accessible via a network, and/or other locations. The video information component 102 may obtain video information from one or more hardware components (e.g., an image sensor, a processor) and/or one or more software components (e.g., software running on a computing device).

In some implementations, the video information component 102 may obtain video information based on user interaction with a user interface/application (e.g., video editing application, video player application), and/or other information. For example, a user interface/application may provide option(s) for a user to edit videos. The video information for a video may be obtained based on the user's selection of the video through the user interface/video application. Other selections of a video for retrieval of video information are contemplated.

The video information may define one or more videos. A video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers are contemplated.

Content of one or more videos may be referred to as video content. Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

In some implementations, the video content may include spherical video content. The field of view of the visual content of spherical video content may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial audio content.

Video information may be stored within a single file or multiple files. For example, video information defining video content may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The video edit information component 104 may be configured to obtain video edit information for the video and/or other information. Obtaining video edit information may include one or more of accessing, acquiring, analyzing, determining, examining, identifying, loading, locating, opening, receiving, retrieving, reviewing, selecting, storing, and/or otherwise obtaining the video edit information. Obtaining the video edit information may include obtaining previously generated/determined video edit information. For example, the video edit information may be stored in a storage location, and the video edit information component 104 may obtain the video edit information from the storage location. Obtaining the video edit information may include generating/determining new video edit information. For example, the video edit information component 104 may use a video to generate a video edit of the video.

The video edit information may define a video edit of one or more videos. The video edit may include one or more segments of the video(s). A video edit of a video may refer to an arrangement and/or a manipulation of one or more segments of the video. A video edit of a video may include one or more segments of the video that have been selected for inclusion in the video edit. A segment of a video may include a point in time or a duration within the progress length of the video. A segment of a video may include a single video frame or multiple video frames of the video.

The video edit information may define a video edit by including information that defines one or more content, qualities, attributes, features, and/or other aspects of the video edit. For example, the video edit information may define a video edit by including information that makes up the content of the video edit and/or information that is used to determine the content of the video edit. For instance, the video edit information may include information that makes up and/or is used to determine the arrangement and/or the manipulation of segment(s) of a video that make up the video edit, such as information that identifies and/or is used to identify which segments of the video are included in the video edit and/or the arrangement/manipulation of the segments in the video edit. Other types of video edit information are contemplated.

The video edit information may be stored within a single file or multiple files. For example, video edit information defining a video edit of a video may be stored within a video edit file, multiple video edit files, a combination of different files, and/or other files. The video edit information may be stored in one or more formats or containers.

In some implementations, segment(s) of a video that have been selected for inclusion in the video edit may include one or more automatically selected segments of the video. An automatically selected segment of the video may refer to a segment of the video that is automatically selected for inclusion in the video edit. The automatically selected segment of the video may be selected for inclusion in the video edit by a computing device/component, such as the processor 11. The automatically selected segment of the video may be selected for inclusion in the video edit based on one or more criteria, such as length of the video, the desired length of the video edit, the length of the segment, occurrence of a highlight event within the segment, content depicted within the segment, metadata for the segment, and/or other criteria.

In some implementations, segment(s) of a video that have been selected for inclusion in the video edit may include one or more manually selected segments of the video. A manually selected segment of the video may refer to a segment of the video that is manually selected for inclusion in the video edit. The manually selected segment of the video may be selected for inclusion in the video by a user, such as via interaction with a user interface/application (e.g., video editing application, video player application).

In some implementations, one or more video effects may be applied to one or more segments of the video included in the video edit. A video effect may refer to manipulation of the underlying video (e.g., visual content, audio content) to generate the video edit. A video effect may change timing characteristics, visual characteristics, audio characteristics, and/or other characteristics of the underlying video to generate the video edit. For example, a video effect applied to a video to generate the video edit may include a looping effect. A looping effect refer to manipulation of the underlying video to generate a looping presentation of the video. A looping effect may modify the underlying video so that the video edit includes a looping (e.g., repeating) presentation. A looping effect may change how visual content of the video is presented within a looping presentation. A looping effect may change how audio content of the video is played back within a looping presentation. A looping effect may change the perceived speed and/or ordering with which segments of the video is played back within a looping presentation. Other types of video effects are contemplated.

In some implementations, one or more characteristics of the video edit may be determined based on one or more effect values used in the video effect. For example, the amount of the video included in the video edit (e.g., length of the video segment used in the video edit) and/or the length of the video edit may be determined based on length of the music used in the video edit and/or the style of effect applied in the video edit. For example, a user may be presented with options to select music that is to be played within a looping presentation and the style of visual content modification to be used in the looping presentation. The length of the video segment included in the video edit and/or the length of the video edit (duration of the video that is looped) may be determined based on user selection of the music and/or the style of loop effect.

The graphical user interface component 106 may be configured to present one or more graphical user interfaces on one or more displays. A display may refer to an electronic device that provides visual presentation of information. A display may be configured to present visual content, graphical user interface(s), and/or other information. In some implementations, a display may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. A display may be a standalone device or a component of a computing device, such as a display of a mobile device (e.g., camera, smartphone, smartwatch, tablet, laptop) or a desktop device (e.g., touch monitor). User interaction with elements of the graphical user interface(s) may be received through the display (e.g., touchscreen display) and/or other user interface devices (e.g., keyboard, mouse, trackpad).

In some implementations, the visual content of video/video edit may be presented on the display(s). In some implementations, the visual content of video/video edit may be within the graphical user interface(s). In some implementations, one or more lower fidelity versions of the visual content may be generated for presentation. A lower fidelity version of the visual content may refer to a version (e.g., copy) of the visual content that is reproduced with less quality than the original visual content. For example, a lower fidelity version of the visual content may include a lower resolution version of the visual content, a lower framerate version of the visual content, and/or other lower-quality version of the visual content.

A graphical user interface may refer to a user interface that enables a user to interact with the system 10 through one or more interface elements. A graphical user interface may refer to a user interface that enables the system 10 to provide information to a user through one or more interface elements. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

An interface element may refer to a graphical element of the user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., touchscreen display, keyboard, mouse, trackpad) and/or other user input. For example, a graphical user interface may present/include the interface elements in a particular arrangement and enable the user to interact with individual interface elements by engaging with locations corresponding to the individual interface elements on a touchscreen display.

A graphical user interface may include interface elements that convey information relating to the video edit. Information relating to the video edit may refer to information relating to content of the video edit, information relating to the video from which the video edit is generated, information relating to usage of the video edit (e.g., presentation of the video edit, storage of the video edit), and/or other information relating to the video edit. The interface elements conveying information relating to the video edit may include the interface elements conveying information relating to video editing decisions made in generating the video edit. A video editing decision may refer to a decision on how one or more videos are edited into the video edit. A video editing decision may include an automatic video editing decision (e.g., edits made by video engine/software/video editing algorithm), a manual video editing decision (e.g., edits made by a user), and/or other video editing decision. The interface elements may provide information on how the video(s) have and/or are being edited to generate the video edit. The interface elements may visually indicate inputs to the video edit generation and/or how the inputs were utilized to generate the video edit.

In some implementations, one or more interface elements may be manipulable to change the video edit. For example, the interface elements may include one or more timeline elements, one or more inclusion elements, and/or other interface elements. A timeline element may refer to an interface element that visually represents the progress length (e.g., duration) of one or more videos. A timeline element may represent the progress length of a single video (e.g., a separate timeline element for individual video) or multiple videos (e.g., a single timeline element to represent combined progress lengths of multiple videos). An inclusion element may refer to an interface element that visually indicates (represents) a segment of the video(s) included in the video edit. An inclusion element may visually indicate a location and/or a length of a segment of a video included in the video edit. An inclusion element may be positioned within, along, above, below, and/or otherwise with respect to the timeline element to visually indicate a segment of a video included in the video edit. An inclusion element may be positioned with respect to the timeline element to visually mark/distinguish a segment of a video included in the video edit from other segment(s) of the video not included in the video edit.

A user may manipulate the timeline element(s) and/or inclusion element(s) to modify that segment(s) of the video that are included in the video edit. For example, user input to the system 10 to modify the segment(s) of the video included in the video edit may be received via user interaction with the timeline element(s) and/or the inclusion element(s) to change the location(s) of the inclusion element(s) along the timeline element(s). For instance, the user may drag an inclusion element from one location along a timeline element to another location along the timeline element, or the user may drag the timeline element to change placement of the inclusion element along the timeline element. User input to the system 10 to modify the segment(s) of the video included in the video edit may be received via user interaction with the timeline element(s) and/or the inclusion element(s) to change the size(s) of the inclusion element(s) along the timeline element. For instance, the user may decrease the length of an inclusion element along a timeline element to shorten the video segment included in the video edit or increase the length of an inclusion element along a timeline element to lengthen the video segment included in the video edit. Other manipulations of the interface element to change the video edit are contemplated.

The graphical user interface may include one or more sections. Different sections of the graphical user interface may provide different information. For example, the graphical user interface may include a preview section. The preview section may provide a preview of the video and the video edit. The preview of the video and the video edit provided in the preview section may include: (1) presentation of the video edit during video edit playback; and (2) presentation of the video during modification of the segment of the video included in the video edit.

Video edit playback may refer to playback may refer to playback of the video edit. Video edit playback may refer to a mode of video presentation in which the video edit is presented on a display. In some implementations, the presentation of the video edit during the video edit playback may include presentation of an edited version of the video. The edited version of the video may include the video that has been modified in the video edit. That is, rather than presenting the underlying video used to generate the video edit, the video edit itself may be presented within the preview section.

In some implementations, the video edit playback may be engaged based on user interaction with a playback element of the graphical user interface). In some implementations, the playback of the video engaged via user interaction with the playback element may include playback of the video edit. For example, when a user pressed a playback element, the video edit of a video, rather than the underlying video, may be played.

The preview section may switch from presenting the video edit (edited version of the video) to presenting the underlying video (unedited version of the video). Rather than presenting the video edit, the preview section may present the video during modification of the segment(s) of the video included in the video edit. Modification of the segment(s) of the video included in the video edit may include changes in location and/or size/length of the segment(s) of the video included in the video edit. That is, when a user is providing input to the system 10 to change which segment of a video is to be used in generating a video edit, the preview section may automatically switch from presenting the video edit (edited version of the video) to presenting the video (unedited version of the video).

In some implementations, the preview of the video and the video edit changes from the presentation of the edited version of the video to the presentation of the unedited version of the video responsive to beginning of user input to modify the segment(s) of the video included in the video edit and/or other information. When the user provides the initial input to make changes to the segment(s) of the video included in the video edit (starts changing the video segment selection for the video edit), the preview section may switch from presenting the video edit (edited version of the video) to presenting the video (unedited version of the video). Such automatic switch in views of the video may make it easier for the user to identify which portion of the underlying video are to be included in the video edit.

In some implementations, the preview of the video and the video edit changes from the presentation of the unedited version of the video to the presentation of the edited version of the video responsive to ending of the user input to modify the segment of the video included in the video edit and/or other information. When the user provides the final input to change the segment(s) of the video included in the video edit (finishes changing the video segment selection for the video edit), the preview section may switch from presented the video (unedited version of the video) to presenting the video edit (edited version of the video). Such automatic switch in views of the video may make it easier for the user to see the result of change in video segment selection for the video edit.

In some implementations, the video edit playback may be engaged automatically based on the ending of the user input to modify the segment of the video included in the video edit and/or other information. When the user provides the final input to change the segment(s) of the video included in the video edit, the video edit playback may automatically start to show the video edit. Based on user's change in video segment selection, the video edit playback may include presentation of a new version of the video edit.

For example, a video edit may include a looping effect applied to a segment of a video. When a user engages a playback element of a graphical user interface, a looping presentation of the video edit may be presented within the preview section. A user may start changing the segment of the video included in the video edit by dragging an inclusion element along a timeline element. When the user is interacting with the inclusion element, the preview section may stop presenting the playback of the video edit and may rather provide a view of the underlying video (switch from a video playback view that includes the view of the video edit to a scrubber view that includes the view of the underlying video). Such change in view may help the user in deciding which segment of the video is to be included in the video edit. When the user finishes modifying the segment of the video included in the video edit (e.g., lets go of the inclusion element, engages with an interface element to confirm selection of the new video segment to be included in the video edit), the preview section may stop presenting the view of the underlying video to presenting the playback of the video edit (switch from the scrubber view that includes the view of the underlying video to the video playback view that includes the view of the video edit). That is, once the user finishes selection of the video segment to be included in the video edit, the preview section may again show the video edit.

In some implementations, the view of the video may automatically switch between the video edit and the video responsive to other user input to change other aspects of the video edit. For example, the preview of the video and the video edit provided in the preview section may include (1) presentation of the video during selection of a portion of the video to which one or more video effects is applied, and (2) presentation of the video edit after the selection of the portion of the video to which video effects is applied. For instance, a video edit may include the underlying video modified by applying of a video effect to a particular portion (e.g., point, duration) of the video. When the user is changing the portion to which the video effect is applied (e.g., such as by dragging an interface element that represents the portion of the video to which video effect is applied), the preview section may automatically switch to presenting the underlying video. Such automatic switch in views of the video may make it easier for the user to identify which portion of the underlying video are to be changed via the video effect. When the user finishes changing the portion to which the video effect is applied (e.g., letting of the interface element that represents the portion of the video to which video effect is applied, engages with an interface element to confirm selection of the new video portion to which video effect is applied), the preview section may automatically switch to presenting the new version of the video edit. Such automatic switch in views of the video may make it easier for the user to see the result of change in video portion selection for the video edit. Other automatically switching of video views are contemplated.

FIGS. 3A, 3B, 3C, 3D, 4A, and 4B illustrates example graphical user interfaces 300, 400 that switches between a view of a video and a view of a video edit. The views of the graphical user interfaces 300, 400 in FIGS. 3A, 3B, 3C, 3D, 4A, and 4B are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 3A, 3B, 3C, 3D, 4A, and 4B.

Figure 3A:
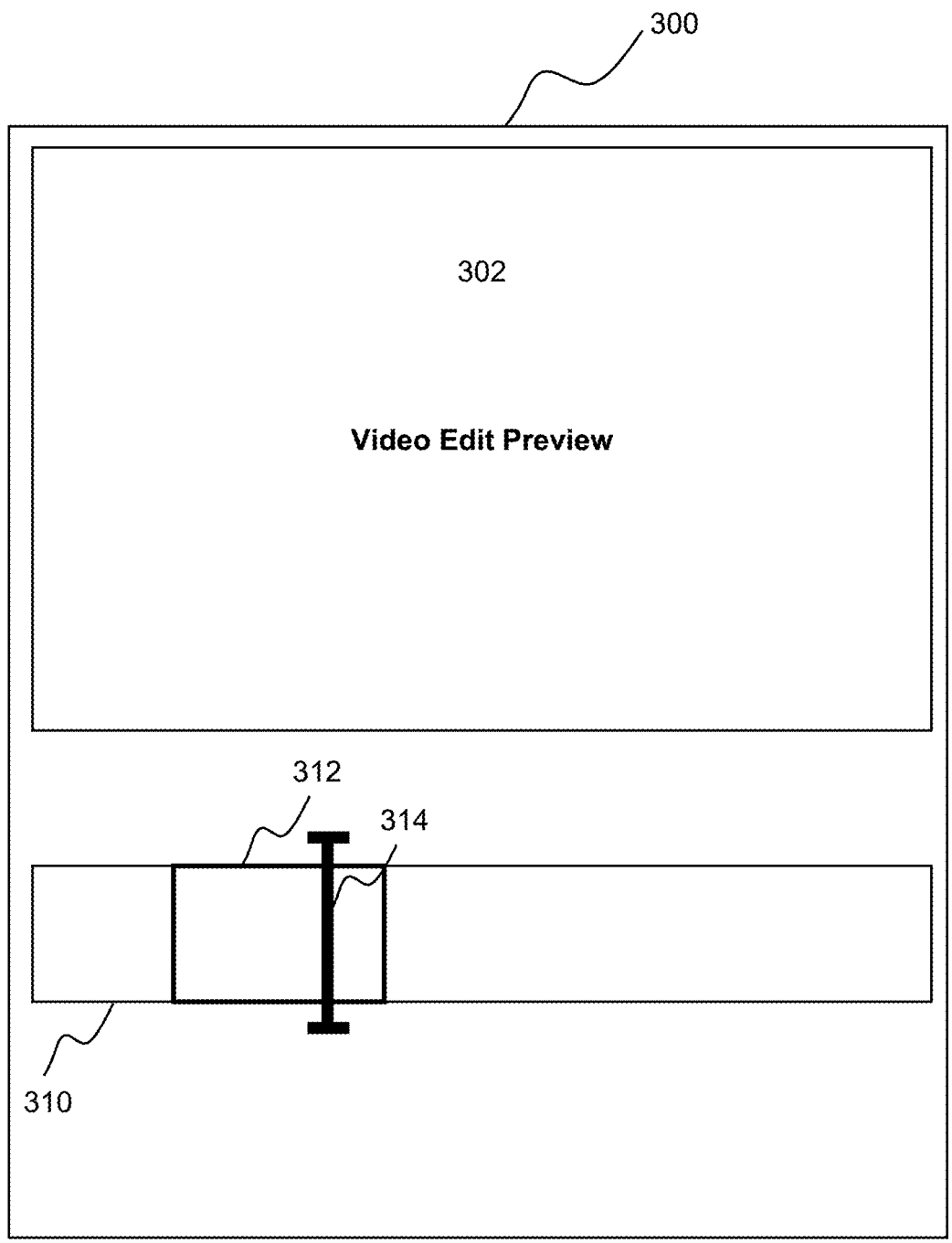
FIG. 3A illustrates example graphical user interface that switches between a view of a video and a view of a video edit.
Figure 3B:
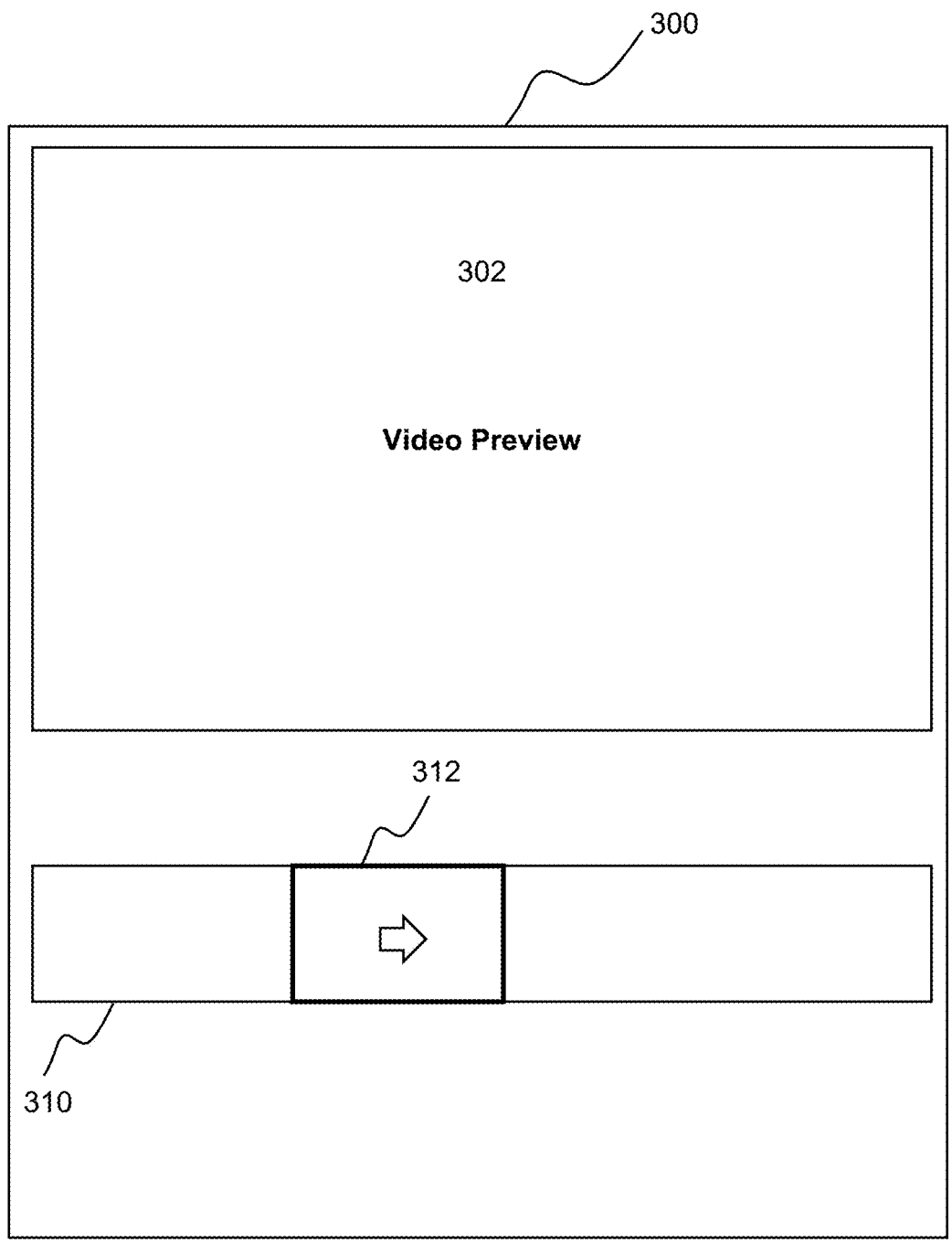
FIG. 3B illustrates example graphical user interface that switches between a view of a video and a view of a video edit.

Referring to FIG. 3A, the graphical user interface 300 may include a preview section 302. The preview section 302 may include presentation of visual content (visual content of video(s), visual content of a video edit). The graphical user interface 300 may include a timeline element 310. The timeline element 310 may represent the progress length of the video being edited. In some implementations, only a portion of the progress length of the video (e.g., zoomed in portion of the progress length) may be represented at a time by the timeline element. One or more selection elements may be presented within/along the timeline element 310 to visually indicate one or more segments of the video that have been selected for the video edit (e.g., selection for inclusion in the video edit, selection for applying of a video effect to generate the video edit). For example, in FIG. 3A, a selection element 312 may visually indicate a segment of the video that has been selected for the video edit.

When video playback is engaged, the preview section 302 may present the visual content of the video edit. For example, current playback position of the video playback may be indicated by a current moment element 314. The preview section 302 may present the visual content of video edit at the moment indicated by the current moment element 314.

The user may interact with the timeline element 310 and/or the selection element 312 to modify the selection of video segment for the video edit. For example, referring to FIG. 3B, the user may have dragged the selection element 312 to the right along the timeline element 310. Such user action may result in a later segment of the video being included in the video edit. That is, user input to modify the segment of the video selected for the video edit may be obtained based on user interaction with the selection element 312 to change the location of the selection element 312 along the timeline element 310. Such user action may result in generation of a different version of the video edit.

When the user is dragging the selection element 312, the preview section 302 may automatically switch from presenting the video edit to presenting the underlying video. For example, rather than presenting the moment of the video edit marked by the current moment element 314 in FIG. 3A, the preview section 302 may present the moment of the underlying video within the selection element 312. For example, the preview section 302 may present the moment of the underlying video at the center of the selection element 312 based on the selection element 312 being dragged to a different location. As the user drags the selection element 312 along the timeline element 310, the center of the selection element 312 may change and the preview section 302 may be updated to present the moment of the underlying video that is currently at the center of the selection element 312. When the user finishes the change in the video segment selection, the preview section 302 may automatically switch from presenting the underlying video to presenting the video edit (e.g., new version of the video edit).

Figure 3C:
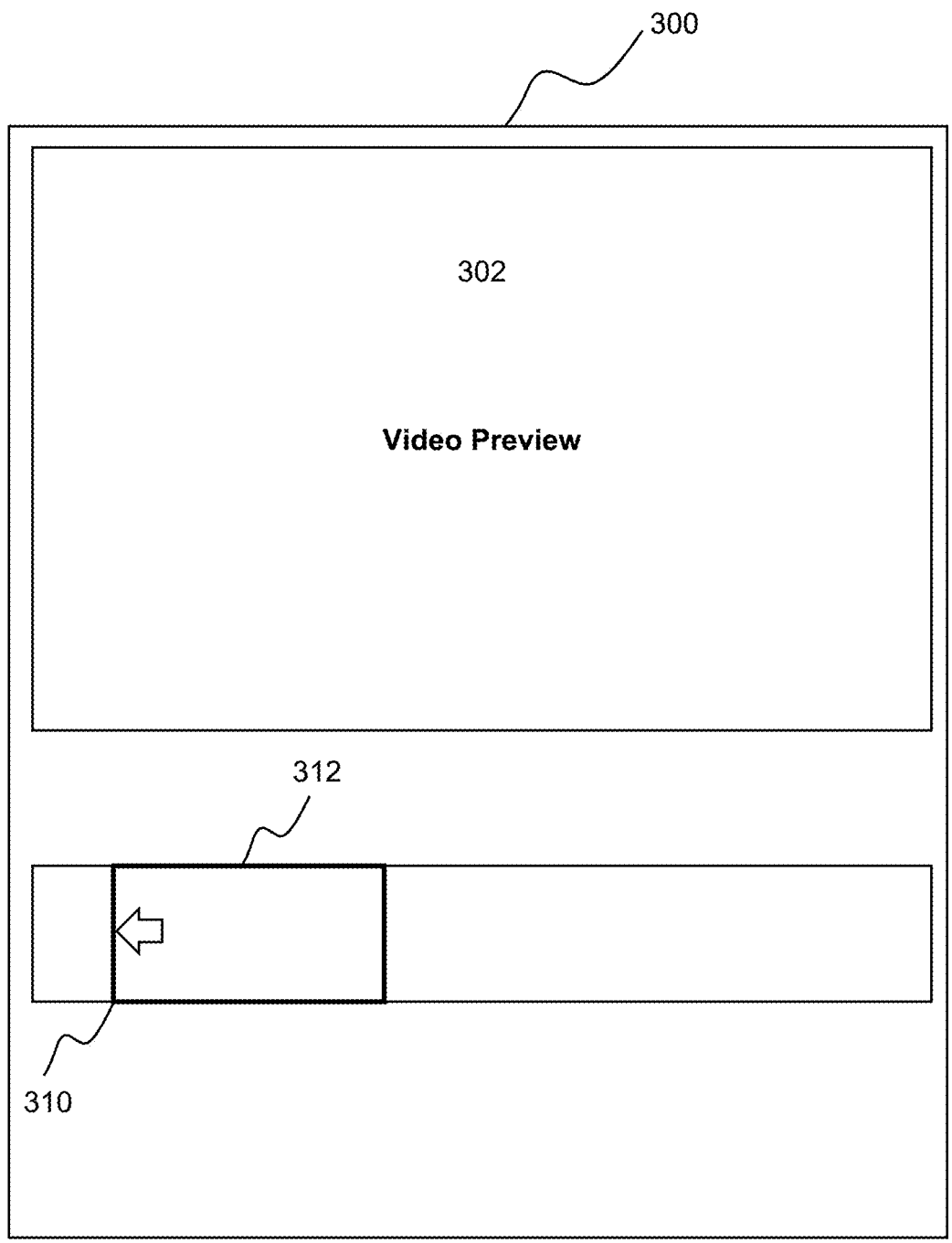
FIG. 3C illustrates example graphical user interface that switches between a view of a video and a view of a video edit.

Referring to FIG. 3C, the user may have modified the selection of video segment for the video edit by moving the starting position of the selection element 312 to the left. That is, the user may have modified the selection of video segment for the video edit by moving the starting position of the selected video segment. Such user action may result in a longer segment of the video being included in the video edit. That is, user input to modify the segment of the video selected for the video edit may be obtained based on user interaction with the selection element 312 to change the size of the selection element 312 along the timeline element 310. Such user action may result in generation of a different version of the video edit.

When the user is changing the starting position of the selection element 312, the preview section 302 may automatically switch from presenting the video edit to presenting the underlying video. For example, rather than presenting the moment of the video edit marked by the current moment element 314 in FIG. 3A, the preview section 302 may present the moment of the underlying video within the selection element 312. For example, the preview section 302 may present the moment of the underlying video at the start of the selection element 312 based on the starting position of the selection element 312 being changed. As the user moves the starting position of the selection element 312, the start of the selection element 312 may change and the preview section 302 may be updated to present the moment of the underlying video that is currently at the start of the selection element 312. When the user finishes the change in the video segment selection, the preview section 302 may automatically switch from presenting the underlying video to presenting the video edit (e.g., new version of the video edit).

Figure 3D:
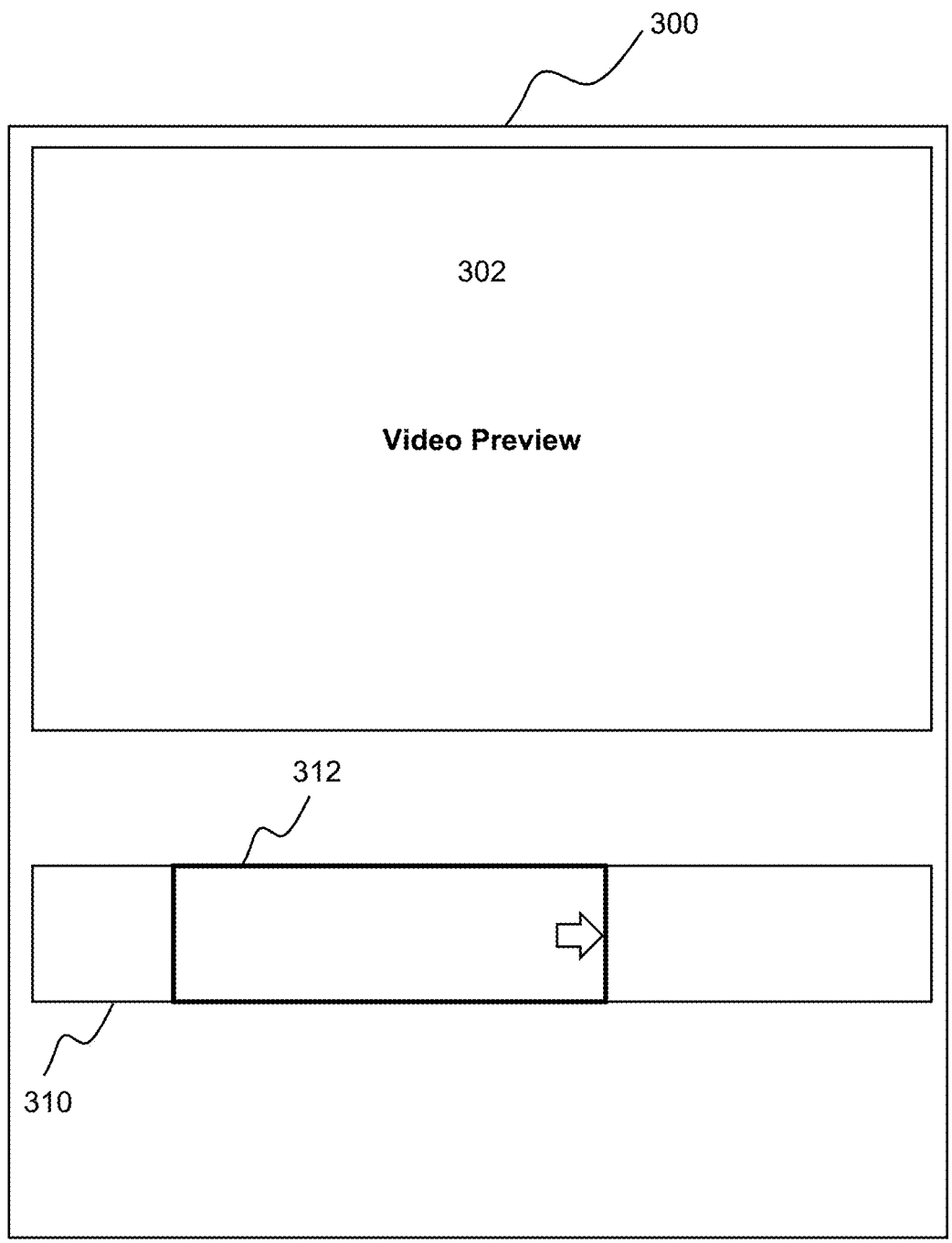
FIG. 3D illustrates example graphical user interface that switches between a view of a video and a view of a video edit.

Referring to FIG. 3D, the user may have modified the selection of video segment for the video edit by moving the ending position of the selection element 312 to the right. That is, the user may have modified the selection of video segment for the video edit by moving the ending position of the selected video segment. Such user action may result in a longer segment of the video being included in the video edit. That is, user input to modify the segment of the video selected for the video edit may be obtained based on user interaction with the selection element 312 to change the size of the selection element 312 along the timeline element 310. Such user action may result in generation of a different version of the video edit.

When the user is changing the ending position of the selection element 312, the preview section 302 may automatically switch from presenting the video edit to presenting the underlying video. For example, rather than presenting the moment of the video edit marked by the current moment element 314 in FIG. 3A, the preview section 302 may present the moment of the underlying video within the selection element 312. For example, the preview section 302 may present the moment of the underlying video at the end of the selection element 312 based on the ending position of the selection element 312 being changed. As the user moves the ending position of the selection element 312, the end of the selection element 312 may change and the preview section 302 may be updated to present the moment of the underlying video that is currently at the end of the selection element 312. When the user finishes the change in the video segment selection, the preview section 302 may automatically switch from presenting the underlying video to presenting the video edit (e.g., new version of the video edit).

Figure 4A:
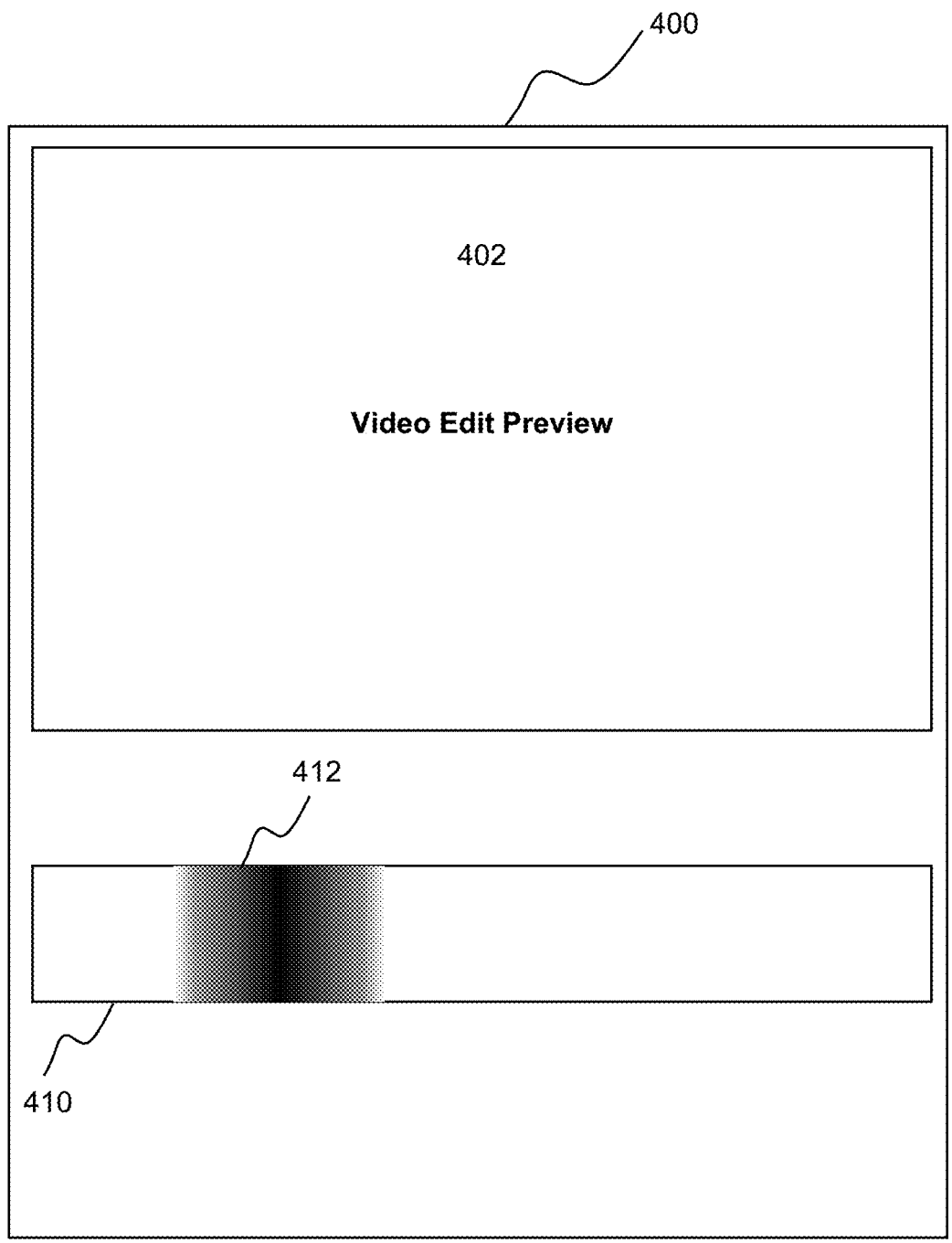
FIG. 4A illustrates example graphical user interface that switches between a view of a video and a view of a video edit.

Referring to FIG. 4A, the graphical user interface 400 may include a preview section 402. The preview section 402 may include presentation of visual content (visual content of video(s), visual content of a video edit). The graphical user interface 400 may include a timeline element 410. The timeline element 410 may represent the progress length of the video being edited. In some implementations, only a portion of the progress length of the video (e.g., zoomed in portion of the progress length) may be represented at a time by the timeline element. One or more selection elements may be presented within/along the timeline element 410 to visually indicate one or more segments of the video that have been selected for the video edit (e.g., selection for inclusion in the video edit, selection for applying of a video effect to generate the video edit). For example, in FIG. 4A, a selection element 412 may visually indicate a segment of the video that has been selected for the video edit.

The selection element 412 may include gradient of color. For example, the center of the selection element 412 may be darker/more saturated than the sides/edges of the selection element 412. Such visual characteristics of the selection element 412 may visually indicate that the actual segment of the video used in the video edit may be flexible. For example, the gradient in the selection 412 may indicate that the segment of the video included in the video edit is somewhere within the gradient but may not extend all the way from the beginning of the gradient to the end of the gradient.

When video playback is engaged, the preview section 402 may present the visual content of the video edit. For example, the graphical user interface 400 may include a current moment element to indicate the current moment of the video edit being presented within the preview section 402.

Figure 4B:
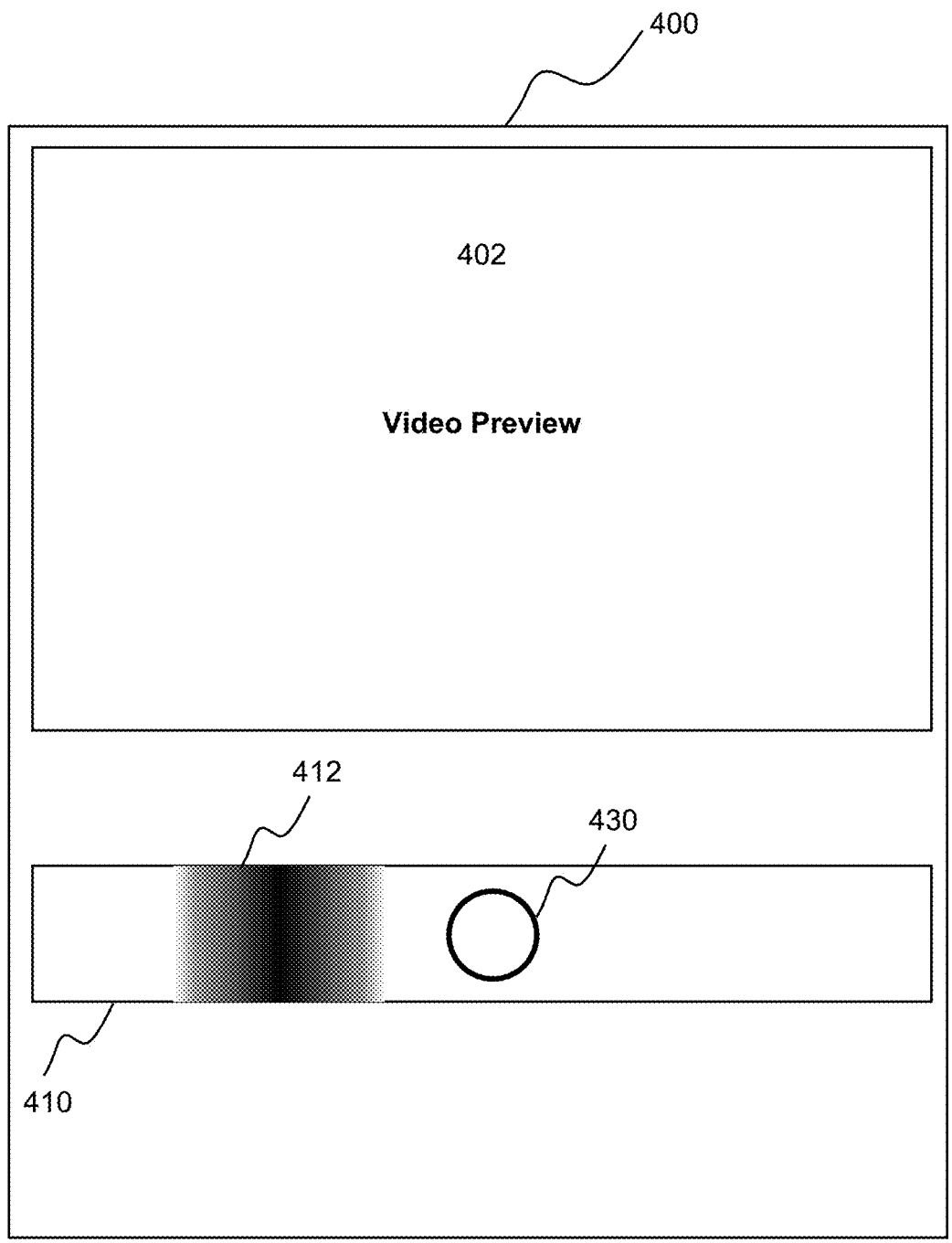
FIG. 4B illustrates example graphical user interface that switches between a view of a video and a view of a video edit.

The user may interact with one or more interface elements to modify the selection of video segment for the video edit. For example, referring to FIG. 4B, the graphical user interface may include a moment marker element 430. The moment marker element 430 may indicate a location of a moment (e.g., highlight moment, center moment) selected for the video edit. A user may change the selection of video segment for the video edit by changing the location of the moment marker element 430. For example, as shown in FIG. 4B, the user may have dragged the moment marker element 430 to the right of the selection element 412. Such user action may result in a later segment of the video being considered for selection. When the user is changing the position of the moment marker element 430, the preview section 402 may automatically switch from presenting the video edit to presenting the underlying video. For example, rather than presenting the moment of the video edit marked by a current moment element, the preview section 402 may present the moment of the underlying video corresponding to the moment marker element 430. For example, the preview section 402 may present the moment of the underlying video at the center of the moment marker element 430 based on the position of the moment marker element 430 being changed. As the user moves the moment marker element 430, the center of the moment marker element 430 may change and the preview section 430 may be updated to present the moment of the underlying video that is current at the center of the moment marker element 430. When the user finishes the change in the video segment selection (e.g., releasing the moment marker element 430, clicking on the moment marker element 430), the preview section 402 may automatically switch from presenting the underlying video to presenting the video edit (e.g., new version of the video edit).

FIGS. 5A, 5B, 5C, and 5D illustrate example moments of a video/video edit presented during playback. A video may have a progress length 500. A segment 512 of the video (duration within the progress length 500) may be selected for the video edit (e.g., for inclusion in the video edit, for application of a video effect). Playback of the video edit may include presentation of sequential moments within the video edit that includes the selected segment 512. For example, in FIG. 5A, the playback of the video edit may have proceeded to the ¾ point within the selected segment 512, as indicated by a current play position indicator 514.

Figure 5A:
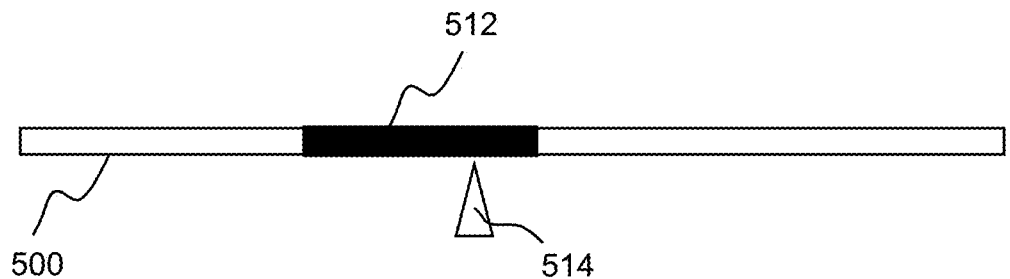
FIG. 5A illustrates an example moment of a video edit presented during video edit playback.
Figure 5B:
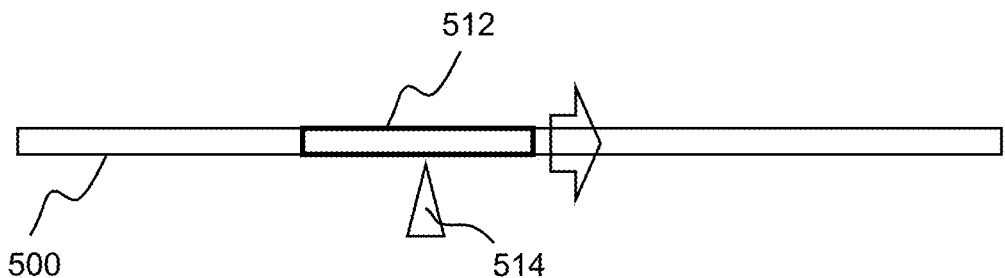
FIG. 5B illustrates an example moment of a video presented during modification of a video segment selection.
Figure 5C:
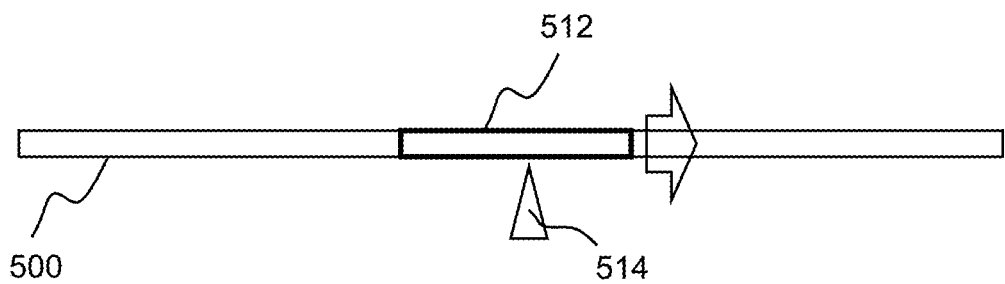
FIG. 5C illustrates an example moment of a video presented during modification of a video segment selection.
Figure 5D:
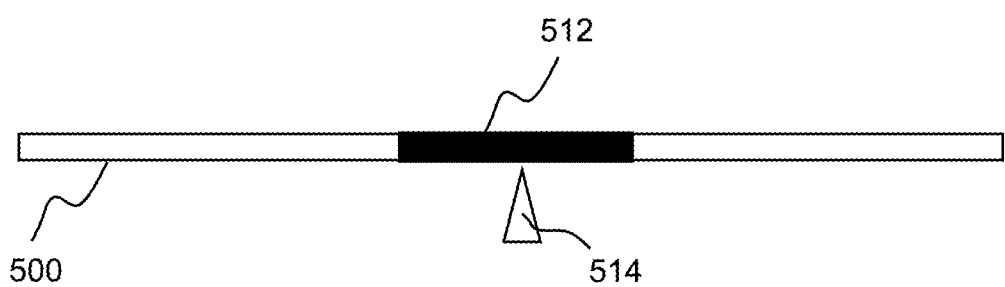
FIG. 5D illustrates an example moment of a video edit presented during video edit playback.

Responsive to user modification of the selected segment, the view of the video presented on a display may automatically change from presentation of the video edit to the presentation of the underlying video. For example, the user may change the selected segment 512 by moving the selection to the right. As the user makes the change to the selected segment 512, the underlying video, rather than the video edit, may be presented on the display. In some implementations, the underlying video may be shown from the last point of the video edit that was shown (e.g., from the ¾ point of the selected segment 512). In some implementations, the underlying video may be shown from another point within the currently selected segment (e.g., the starting point, the middle point, the ending point). For example, in FIG. 5B, the time point of underlying video that is shown may correspond to the center of the selected segment 512. As shown in FIG. 5C, as the selected segment 512 is changed to a later duration within the progress length 500, the presentation of the underlying video may follow to continue showing the center of the selected segment 512.

When user finishes the change to the selected segment 512, the video edit, rather than the underlying video, may be presented on the display. For example, in FIG. 5D, the user may have finished changing the selected segment 512. Responsive to the user finishing the modification to the selected segment 512, the view of the video presented on the display may automatically change from presentation of the underlying video to the presentation of the video edit (newer version of the video edit that utilizes the newly selected segment). In some implementations, the video edit may be shown from the last point of the video that was shown (e.g., from the center point of the selected segment 512). In some implementations, the video edit may be shown from another point within the currently selected segment (e.g., the starting point, the ¾ point to match the point shown in FIG. 5A, the ending point).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
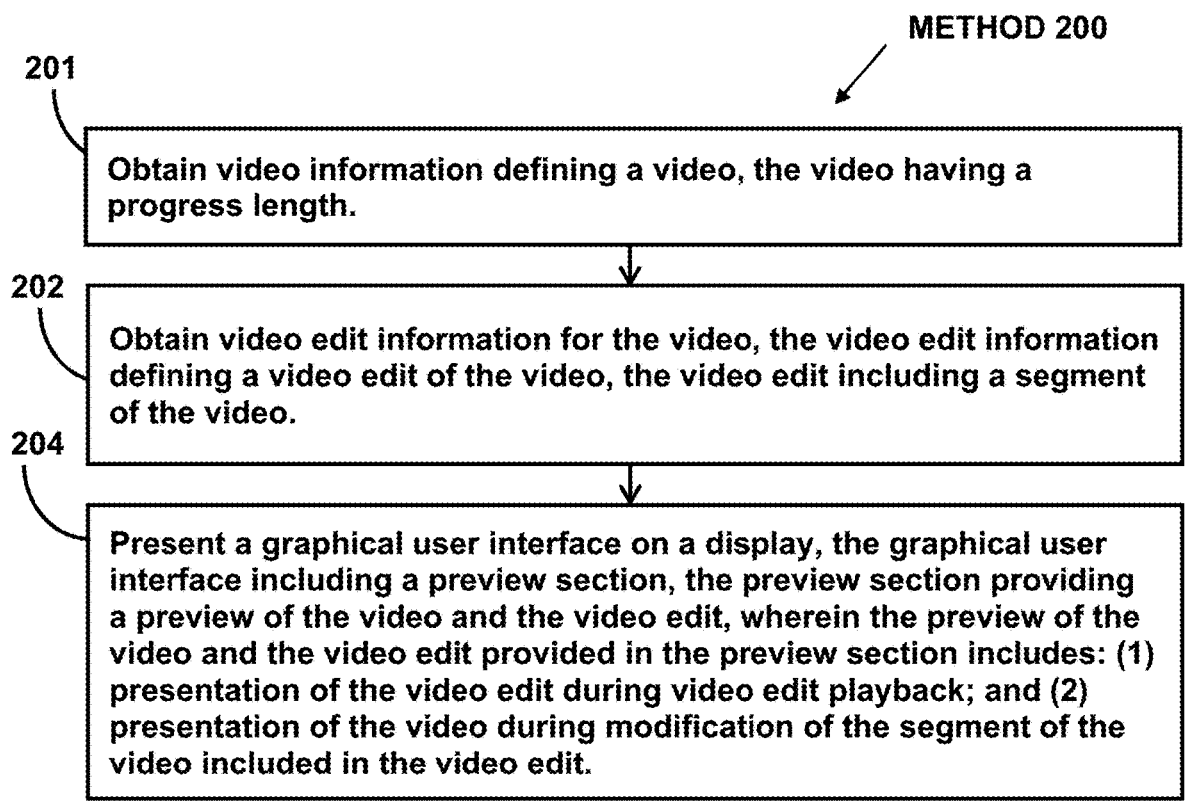
FIG. 2 illustrates a method for presenting an interface that switches between a view of a video and a view of a video edit.

FIG. 2 illustrates method 200 for presenting an interface that switches between a view of a video and a view of a video edit. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video having a progress length. In some implementations, operation 201 may be performed by a processor component the same as or similar to the video information component 102 (Shown in FIG. 1 and described herein).

At operation 202, video edit information may be obtained. The video edit information may define a video edit of the video. The video edit may include a segment of the video. In some implementations, operation 202 may be performed by a processor component the same as or similar to the video edit information component 104 (Shown in FIG. 1 and described herein).

At operation 203, a graphical user interface may be presented on a display. The graphical user interface may include a preview section. The preview section may provide a preview of the video and the video edit. The preview of the video and the video edit provided in the preview section may include: (1) presentation of the video edit during video edit playback; and (2) presentation of the video during modification of the segment of the video included in the video edit. In some implementations, operation 202 may be performed by a processor component the same as or similar to the graphical user interface component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for switching between video views, the system comprising:
   one or more physical processors configured by machine-readable instructions to:
      obtain video information defining a video, the video having a progress length;
      obtain video edit information for the video, the video edit information defining a video edit of the video, the video edit including a video effect applied to a segment of the video; and
      present a graphical user interface on a display, the graphical user interface including a preview section, the preview section automatically switching between providing a preview of the video and providing a preview of the video edit, wherein automatically switching between providing the preview of the video and providing the preview of the video edit in the preview section includes:
         presenting the preview of the video edit in the preview section, the presentation of the preview of the video edit including presentation of an edited version of the video with the video effect applied to the segment of the video; and
         responsive to user input to modify the segment of the video included in the video edit, presenting the preview of the video in the preview section, the presentation of the preview of the video including presentation of an unedited version of the video without the video effect.

2. The system of claim 1, wherein responsive to ending of the user input to modify the segment of the video included in the video edit, the preview section automatically switches back from providing the preview of the video to providing the preview of the video edit.

3. The system of claim 2, wherein video edit playback is engaged automatically based on the ending of the user input to modify the segment of the video included in the video edit.

4. The system of claim 1, wherein the preview section automatically switches from providing the preview of the video edit to providing the preview of the video during user selection of a portion of the video to which the video effect is applied.

5. The system of claim 1, wherein the graphical user interface further includes:
   a timeline element that represents the progress length of the video; and
   an inclusion element that represents the segment of the video included in the video edit.

6. The system of claim 5, wherein the user input to modify the segment of the video included in the video edit is obtained based on user interaction with the inclusion element to change a location of the inclusion element along the timeline element.

7. The system of claim 5, wherein the user input to modify the segment of the video included in the video edit is obtained based on user interaction with the inclusion element to change a size of the inclusion element along the timeline element.

8. A method for switching between video views, the method performed by a computing system including one or more processors, the method comprising:
   obtaining, by the computing system, video information defining a video, the video having a progress length;
   obtaining, by the computing system, video edit information for the video, the video edit information defining a video edit of the video, the video edit including a video effect applied to a segment of the video; and
   presenting, by the computing system, a graphical user interface on a display, the graphical user interface including a preview section, the preview section automatically switching between providing a preview of the video and providing a preview of the video edit, wherein automatically switching between providing the preview of the video and providing the preview of the video edit in the preview section includes:
      presenting the preview of the video edit in the preview section, the presentation of the preview of the video edit including presentation of an edited version of the video with the video effect applied to the segment of the video; and
      responsive to user Input to modify the segment of the video included in the video edit, presenting the preview of the video in the preview section, the presentation of the preview of the video including presentation of an unedited version of the video without the video effect.

9. The method of claim 8, wherein responsive to ending of the user input to modify the segment of the video included in the video edit, the preview section automatically switches back from providing the preview of the video to providing the preview of the video edit.

10. The method of claim 9, wherein video edit playback is engaged automatically based on the ending of the user input to modify the segment of the video included in the video edit.

11. The method of claim 8, wherein the preview section automatically switches from providing the preview of the video edit to providing the preview of the video during user selection of a portion of the video to which the video effect is applied.

12. The method of claim 8, wherein the graphical user interface further includes:
   a timeline element that represents the progress length of the video; and
   an inclusion element that represents the segment of the video included in the video edit.

13. The method of claim 12, wherein the user input to modify the segment of the video included in the video edit is obtained based on user interaction with the inclusion element to change a location of the inclusion element along the timeline element.

14. The method of claim 12, wherein the user input to modify the segment of the video included in the video edit is obtained based on user interaction with the inclusion element to change a size of the inclusion element along the timeline element.

15. The system of claim 1, wherein the user input to modify the segment of the video included in the video edit includes user input to change location of the segment of the video included in the video edit along the progress length of the video.

16. The system of claim 1, wherein the user input to modify the segment of the video included in the video edit includes user input to change length of the segment of the video included in the video edit.

17. The method of claim 8, wherein the user input to modify the segment of the video included in the video edit includes user input to change location of the segment of the video included in the video edit along the progress length of the video.

18. The method of claim 8, wherein the user input to modify the segment of the video included in the video edit includes user input to change length of the segment of the video included in the video edit.

19. A system for switching between video views, the system comprising:
   one or more physical processors configured by machine-readable instructions to:
      obtain video information defining a video, the video having a progress length;
      obtain video edit information for the video, the video edit information defining a video edit of the video, the video edit including a video effect applied to a segment of the video; and
      present a graphical user interface on a display, the graphical user interface including a preview section, the preview section automatically switching between providing a preview of the video and providing a preview of the video edit, wherein automatically switching between providing the preview of the video and providing the preview of the video edit in the preview section includes:
         presenting the preview of the video edit in the preview section, the presentation of the preview of the video edit including presentation of an edited version of the video with the video effect applied to the segment of the video; and
         responsive to user input to modify the segment of the video included in the video edit, presenting the preview of the video in the preview section, the presentation of the preview of the video including presentation of an unedited version of the video without the video effect, wherein the user input to modify the segment of the video included in the video edit includes user input to change location of the segment of the video included in the video edit along the progress length of the video and/or user input to change length of the segment of the video included in the video edit.

20. The system of claim 19, wherein:
   the graphical user interface further includes a timeline element that represents the progress length of the video and an inclusion element that represents the segment of the video included in the video edit;

the user input to change the location of the segment of the video included in the video edit along the progress length of the video is obtained based on user interaction with the inclusion element to change a location of the inclusion element along the timeline element; and the user input to change the length of the segment of the video included in the video edit is obtained based on user interaction with the inclusion element to change a size of the inclusion element along the timeline element.

* * * * *